(12) United States Patent
Miyoshi et al.

(10) Patent No.: US 7,949,058 B2
(45) Date of Patent: May 24, 2011

(54) RADIO RECEIVING APPARATUS AND RADIO RECEIVING METHOD

(75) Inventors: Kenichi Miyoshi, Kanagawa (JP); Akihiko Nishio, Kanagawa (JP); Yuichi Kobayakawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 780 days.

(21) Appl. No.: 11/908,100

(22) PCT Filed: Mar. 10, 2006

(86) PCT No.: PCT/JP2006/304801
§ 371 (c)(1),
(2), (4) Date: Jan. 30, 2008

(87) PCT Pub. No.: WO2006/095874
PCT Pub. Date: Sep. 14, 2006

(65) Prior Publication Data
US 2009/0022232 A1 Jan. 22, 2009

(30) Foreign Application Priority Data
Mar. 10, 2005 (JP) .................................. 2005-066812

(51) Int. Cl.
*H04L 27/28* (2006.01)
*H04K 1/10* (2006.01)

(52) U.S. Cl. ..................................................... 375/260
(58) Field of Classification Search .................... 375/260
See application file for complete search history.

(56) References Cited

U.S. PATENT DOCUMENTS 6,529,472 B1 * 3/2003 Kaneko et al. ............... 370/208
7,289,765 B2 * 10/2007 Okada et al. .................. 455/45

FOREIGN PATENT DOCUMENTS

| JP | 2000-115115 | 4/2000 |
|---|---|---|
| JP | 2000-216752 | 8/2000 |
| JP | 2001-119363 | 4/2001 |
| JP | 2004-040507 | 2/2004 |

OTHER PUBLICATIONS

Dobre, O.A.; Yu-Dong Yao; "An adaptive data transmission scheme for OFDM systems", Proceeding IEEE 56th Vehicular Technology Conference, Proceedings. VTC 2002-Fall, vol. 3, pp. 1398-1403.*
English Translation of International Preliminary Report on Patentability Chapter 1.*
English Translation of the Written Opinion of the International Search Authority.*
International Search Report dated Jun. 1, 2006.

* cited by examiner

*Primary Examiner* — David C. Payne
*Assistant Examiner* — Nader Bolourchi
(74) *Attorney, Agent, or Firm* — Dickinson Wright PLLC (57) ABSTRACT

A radio receiver apparatus and a radio transmitter apparatus wherein the energy loss caused by addition of GI is suppressed, while the reception quality is improved. A signal having been subjected to an IFFT process is repetitively transmitted N times with a length of one OFDM symbol interval. At a receiver apparatus receiving the transmitted signals, a leading data extracting part (207) extracts, from the leading data portions of the direct waves of the received signals, portions that are not interfered with by temporally adjacent data. A combing part (209) combines the received signals in such a manner that align the rear end of each repetitively transmitted data portion except the leading data portion with the rear end of the leading data portion extracted by the leading data extracting part (207). The combined signal is then subjected to an FFT process in an FFT part (210).

3 Claims, 12 Drawing Sheets

PRIOR ART

PRIOR ART

FIG.3

PRIOR ART

FIG.4

PRIOR ART

RADIO RECEIVING APPARATUS AND RADIO RECEIVING METHOD

TECHNICAL FIELD

The present invention relates to a radio transmitting apparatus and a radio receiving apparatus. More particularly, the present invention relates to a radio transmitting apparatus and a radio receiving apparatus used in OFDM (Orthogonal Frequency Division Multiplex) transmission systems.

BACKGROUND ART

In recent years, the OFDM scheme, which enables high speed and large capacity and which improves error robustness, has been studied toward next-generation mobile communication systems. The art disclosed in Patent Document 1 is an example of the OFDM scheme. This art will be briefly described below.

Figure 1:
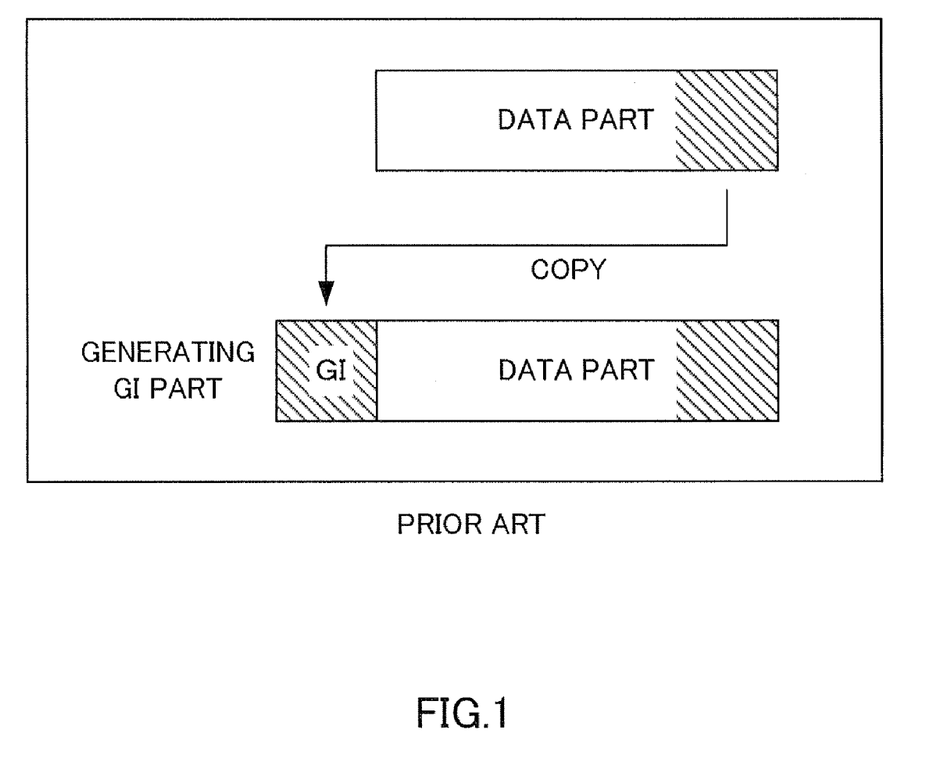
FIG. 1 shows a method of generating GIs.

As shown in FIG. 1, the transmission system disclosed in Patent Document 1 generates signals in which a predetermined part of the rear part of transmission data (data part in the drawing) is attached to the beginning of the data part as a guard interval (hereinafter abbreviated as "GI".) The signals generated as such are transmitted from the transmitting apparatus, and signal combined a direct wave with a delayed wave in a channel are received in a receiving apparatus.

Figure 2:
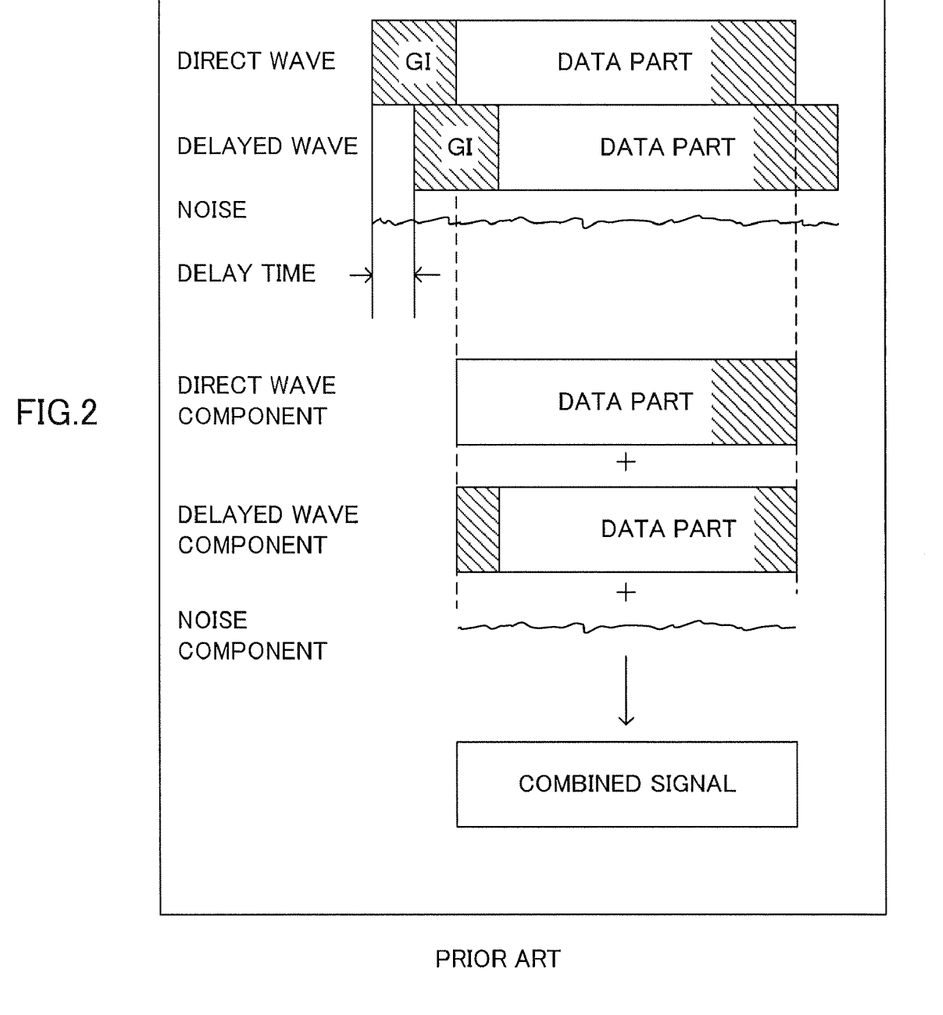
FIG. 2 explains a receiving process in the receiving apparatus disclosed in Patent Document 1.

At receiving apparatus as shown in FIG. 2, a timing synchronization process is performed for the received data, and signals of the length of the data part are extracted from the beginning of the data part of the direct wave. The extracted signals thereby include the direct wave component, the delayed wave component and the noise component from receiving apparatus. And the extracted signals combine all of these components. Then, FFT (Fast Fourier Transform) is performed to the extracted signal and the result is demodulated.

Patent Document 1: Japanese Patent Application Laid-Open No. 2004-40507

DISCLOSURE OF THE INVENTION

Problems to be Solved by the Invention

However, according to the art disclosed in Patent Document 1, inserting GIs equals transmitting the same data repeatedly, and so the energy of GI parts not used in decoding is wasted. Generally, GIs are made 10 to 25% of the data length. In other words, nearly 10 to 25% of transmission power is always wasted.

Figure 3:
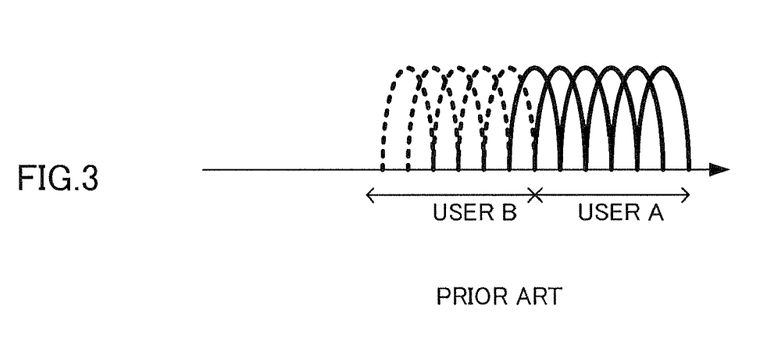
FIG. 3 shows a situation of assigning subcarriers to a plurality of the receiving apparatuses.
Figure 4:
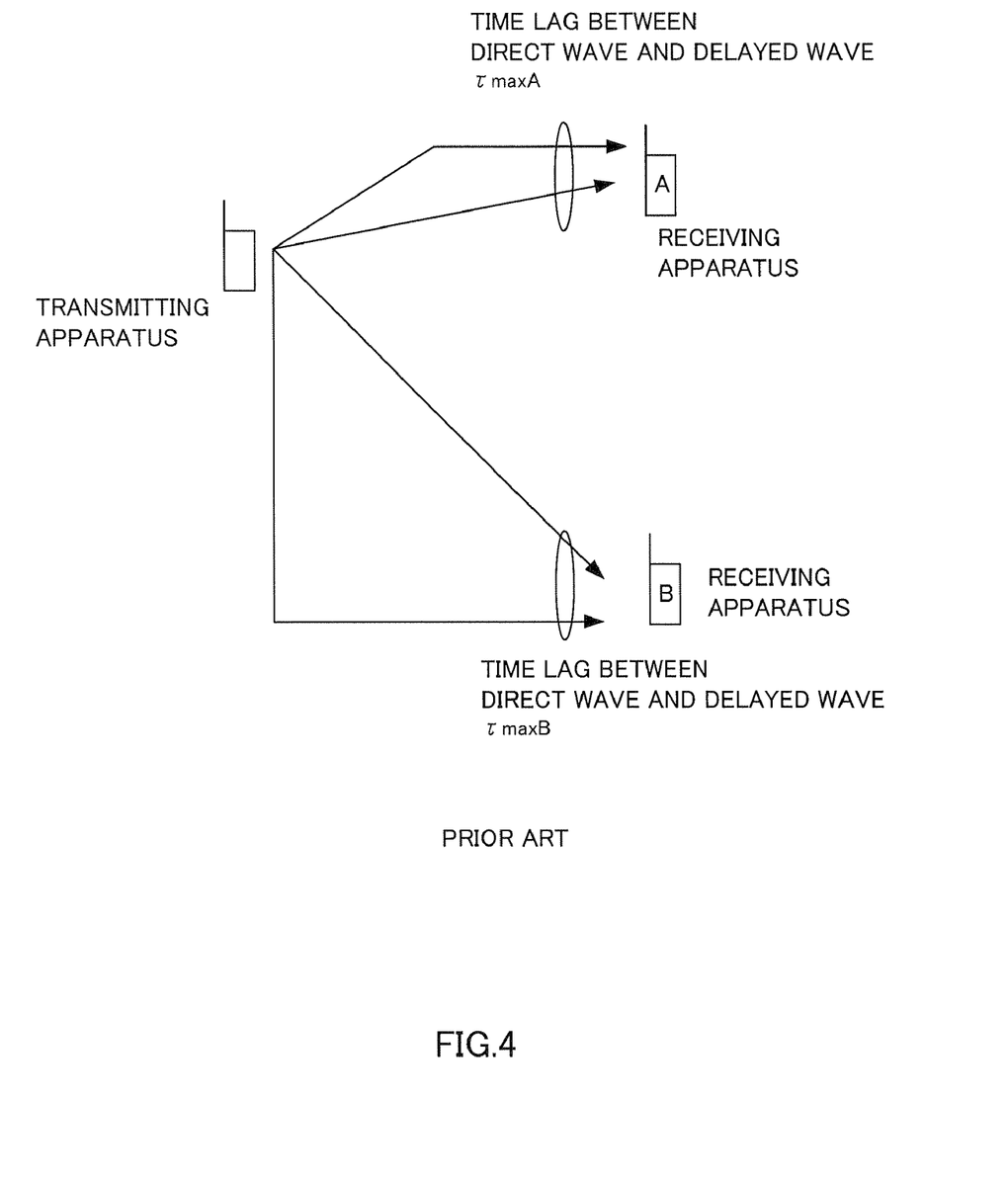
FIG. 4 shows a situation of the different maximum delay time in a plurality of the receiving apparatuses.

When data is transmitted to a plurality of receiving apparatuses using certain OFDM symbols such as upon a broadcast channel transmission, upon a shared control channel transmission, upon a shared data channel transmission, or when part of subcarriers are transmitted to receiving apparatus A and another part of subcarriers are transmitted to receiving apparatus besides receiving apparatus B, energy loss of the GI part increases. To be more specific, as shown in FIG. 3, when the transmitting apparatus transmits signals to receiving apparatus (user) A using part of subcarriers (the subcarriers shown in solid lines in the drawing) and transmits signals to receiving apparatus (user) B using another part of subcarriers (the subcarriers shown in dotted lines in the drawing), it is assumed that the maximum delay time on the channel to receiving apparatus A is $\tau maxA$ and the maximum delay time on the channel to receiving apparatus B is $\tau maxB$ ($\tau maxA < \tau maxB$) (shown in FIG. 4).

Taking into account the above consideration in designing the GI, it is necessary to select the receiving apparatus where the delay wave is maximum and use a GI having a length appropriate for the receiving apparatus selected, and so the GI length needs to be made longer than $\tau maxB$. For the reason, an unnecessarily long GI is transmitted to receiving apparatus A, and the transmission power of this GI is wasted.

It is therefore an object of the present invention to provide a radio transmitting apparatus and a radio receiving apparatus that minimize energy loss due to attachment of GIs and improve received quality.

Means for Solving the Problem

The radio transmitting apparatus of the present invention employs a configuration including: a modulating section that modulates transmission data; an inverting section that inverts the transmission data modulated by the modulating section, from a frequency domain to a time domain; and a data repetition section that repeats transmitting in the time domain the signal converted in the inverting section a plurality of times, on a per data part basis, the data part being a unit of repetition.

The radio receiving apparatus of the present invention employs a configuration including: a receiving section that receives a signal inverted from a frequency domain to a time domain and repeated being transmitted a plurality of times in the time domain; a leading data extracting section that extracts, from a leading data part amongst data parts in the signal received by the receiving section, a portion of the leading data part that is not interfered with data of adjacent time, the data parts being units of repetition in the signal; a combining section that matches and combines a rear end of each data part in the signal received by the receiving section other than the leading data part, with a rear end of the portion of the leading data part extracted by the extracting leading data section; and a converting section that converts the signal combined in the combining section from the time domain to the frequency domain.

Advantageous Effect of the Invention

According to the present invention, energy loss due to attachment of guard intervals is minimized and received quality is improved.

BEST MODE FOR CARRYING OUT THE INVENTION

Embodiments of the present invention will be described below in detail with reference to the accompanying drawings.

Embodiment 1

Figure 5:
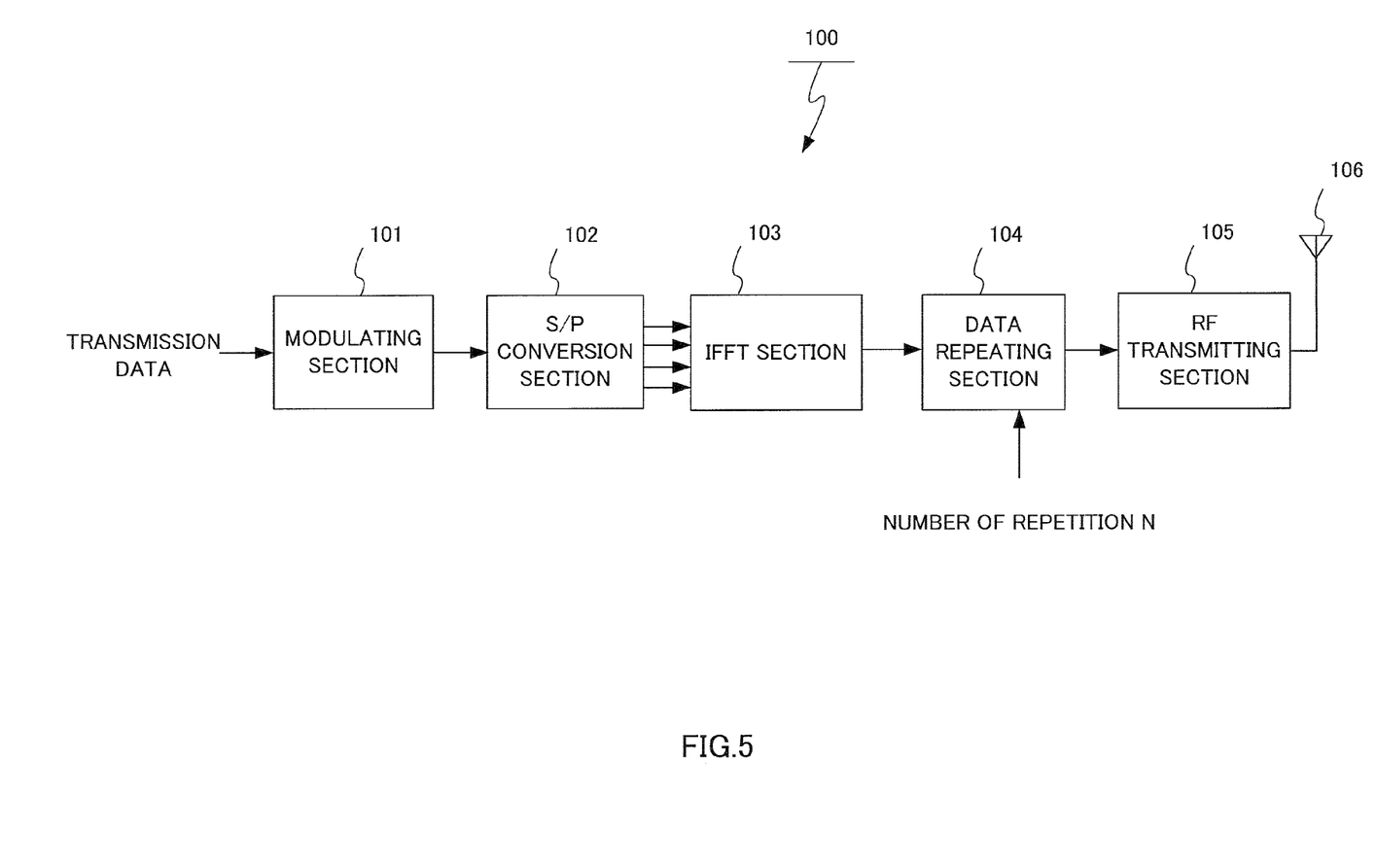
FIG. 5 is a block diagram showing a configuration of a radio transmitting apparatus according to Embodiment 1 of the present invention.

FIG. 5 is a block diagram showing a configuration of radio transmitting apparatus 100 according to Embodiment 1 of the present invention. In the figure, modulating section 101 modulates inputted transmission data using modulation schemes such as PSK modulation and QAM modulation, performs spreading processing on the modulated signal and outputs the signal subjected to spreading processing to S/P conversion section 102.

S/P conversion section 102 converts the serial signal outputted from modulation section 101 into parallel signals, maps the parallel signals to each subcarrier and outputs the converted parallel signals to IFFT (Inverse Fast Fourier Transform) section 103.

By performing IFFT processing with the parallel signals outputted from S/P conversion section 102, IFFT section 103 transforms the frequency domain signals where data is allocated in subcarrier units, to a time domain signal, and outputs this time domain signal to data repeating section 104.

Data repeating section 104 receives as input the number of repetitions N determined by upper layers (not shown) or by propagation environment information, and repeats outputting the time domain data of the signal outputted from IFFT section 103 to RF transmitting section 105 N times.

RF transmitting section 105 performs predetermined transmission processing such as D/A conversion and up-conversion to the signal outputted from data repeating section 104, and transmits the processed signal via antenna 106.

Figure 6:
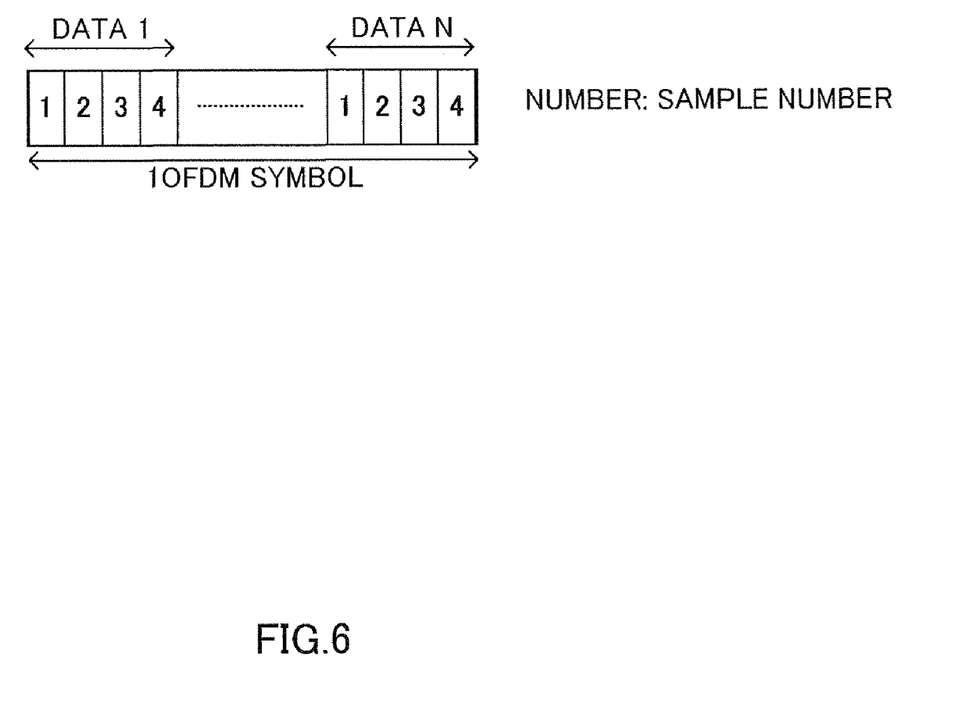
FIG. 6 shows a data format of the signal to be transmitted from the transmitting apparatus shown in FIG. 5.

FIG. 6 shows the data format of the signals that the transmitting apparatus 100 transmits. FIG. 6 shows a case where the number of subcarrier is four and the number of repetitions is N. FIG. 6 shows a case where the signals forming the repetition unit (data) are sample signals and data comprised of four sample signals repeats N times. That is, four time domain sample signals after IFFT are repeated N times to provide 4N samples. These 4N samples are transmitted as one OFDM symbol.

Figure 7:
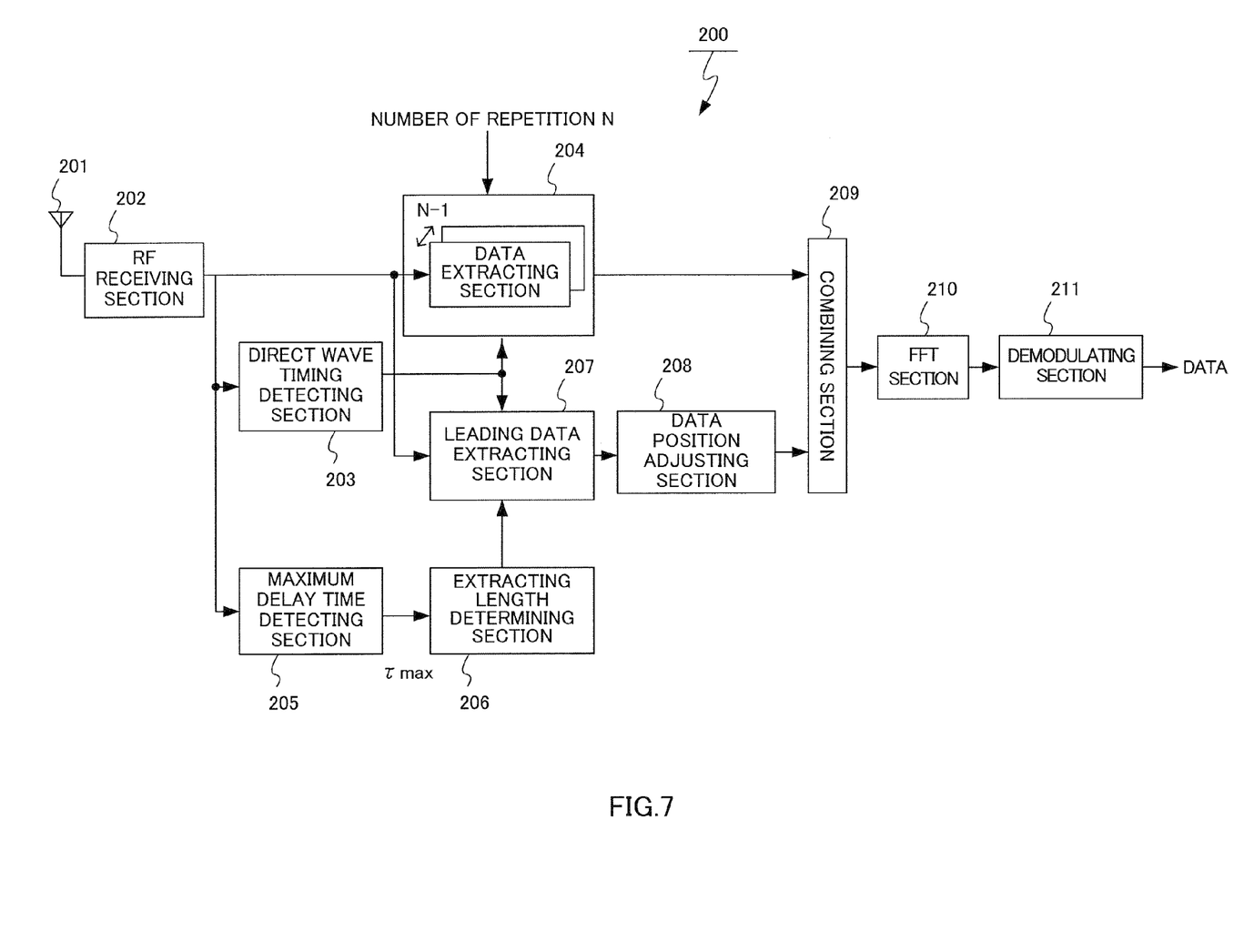
FIG. 7 is a block diagram showing a configuration of a receiving apparatus according to Embodiment 1 of the present invention.

FIG. 7 is a block diagram showing a configuration of radio receiving apparatus 200 according to Embodiment 1 of the present invention. In the figure, RF receiving section 202 performs predetermined receiving processing such as down-conversion and A/D conversion for the received signal via antenna 201 and outputs the processed signal to direct wave timing detecting section 203, data extracting section 204, maximum delay time detecting section 205 and leading data extracting section 207.

Figure 8:
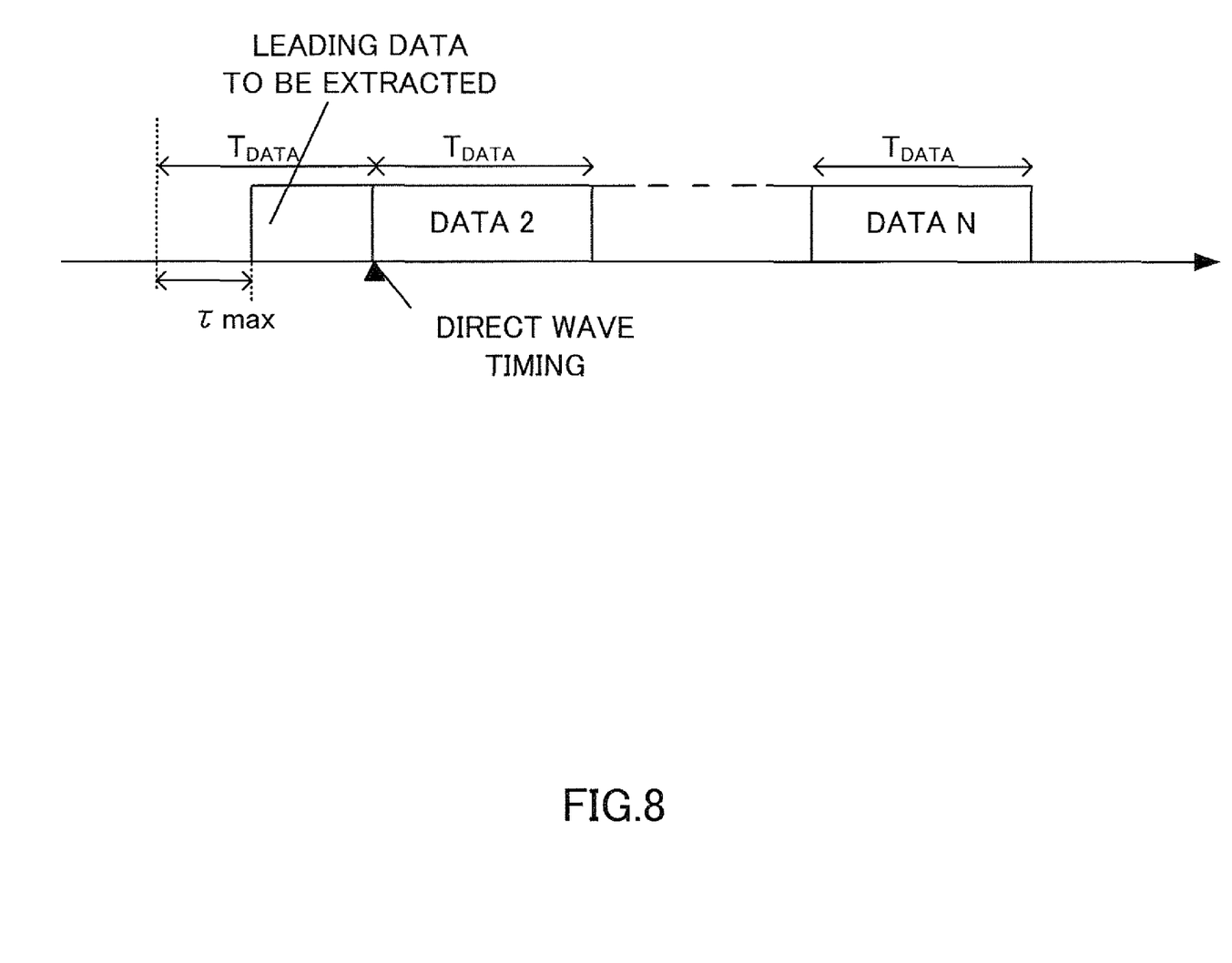
FIG. 8 shows received data in the receiving apparatus shown in FIG. 7.

Direct wave timing detecting section 203 detects the timing of the rear end of the leading data part (data 1) of the direct wave as shown in FIG. 8, that is, the timing of the beginning of the second data part (data 2) and outputs the detected timing to data extracting section 204 and leading data extracting section 207.

Based on the timing outputted from direct wave timing detecting section 203, data extracting section 204 extracts N−1 data (data 2 to N) from the rear end of the leading data part of the direct wave of the signal outputted from RF receiving section 202 and outputs the extracted N−1 data to combining section 209.

Maximum delay time detecting section 205 detects the maximum time of the delayed wave (the maximum delay time τmax) from the signal outputted from RF receiving section 202, and outputs the detected maximum delay time τmax to extracting length determining section 206.

Extracting length determining section 206 obtains the maximum delay time τmax from maximum delay time detecting section 205 and outputs the length given by subtracting the maximum delay time τmax from the data part length $T_{DATA}$ ($T_{DATA}-\tau_{max}$) as the extracted length, to leading data extracting section 207.

Leading data extracting section 207 extracts data of the length found in extracting length determining section 206, from the leading data part of the signal outputted from RF receiving section 202. At the same time, in the leading data part, data is extracted from the position τmax behind the beginning of the OFDM symbol. The extracted leading data (hereinafter referred to as "the extracted leading data") is outputted to data position adjusting section 208.

Data position adjusting section 208 adjusts the rear end of the extracted leading data outputted from leading data extracting section 207 to the position of the rear end of data 2, and outputs the extracted leading data after the data position adjustment, to combining section 209.

Combining section 209 combines data 2 to N outputted from data extracting section 204 and the extracted leading data outputted from data position adjusting section 208, and outputs the combined data to FFT section 210.

By performing the FFT processing for the signal outputted from combining section 209, FFT section 210 converts the time domain signal to a frequency domain signal, and demodulating section 211 demodulates the signal outputted from FFT section 210 and outputs the demodulated data.

Figure 9:
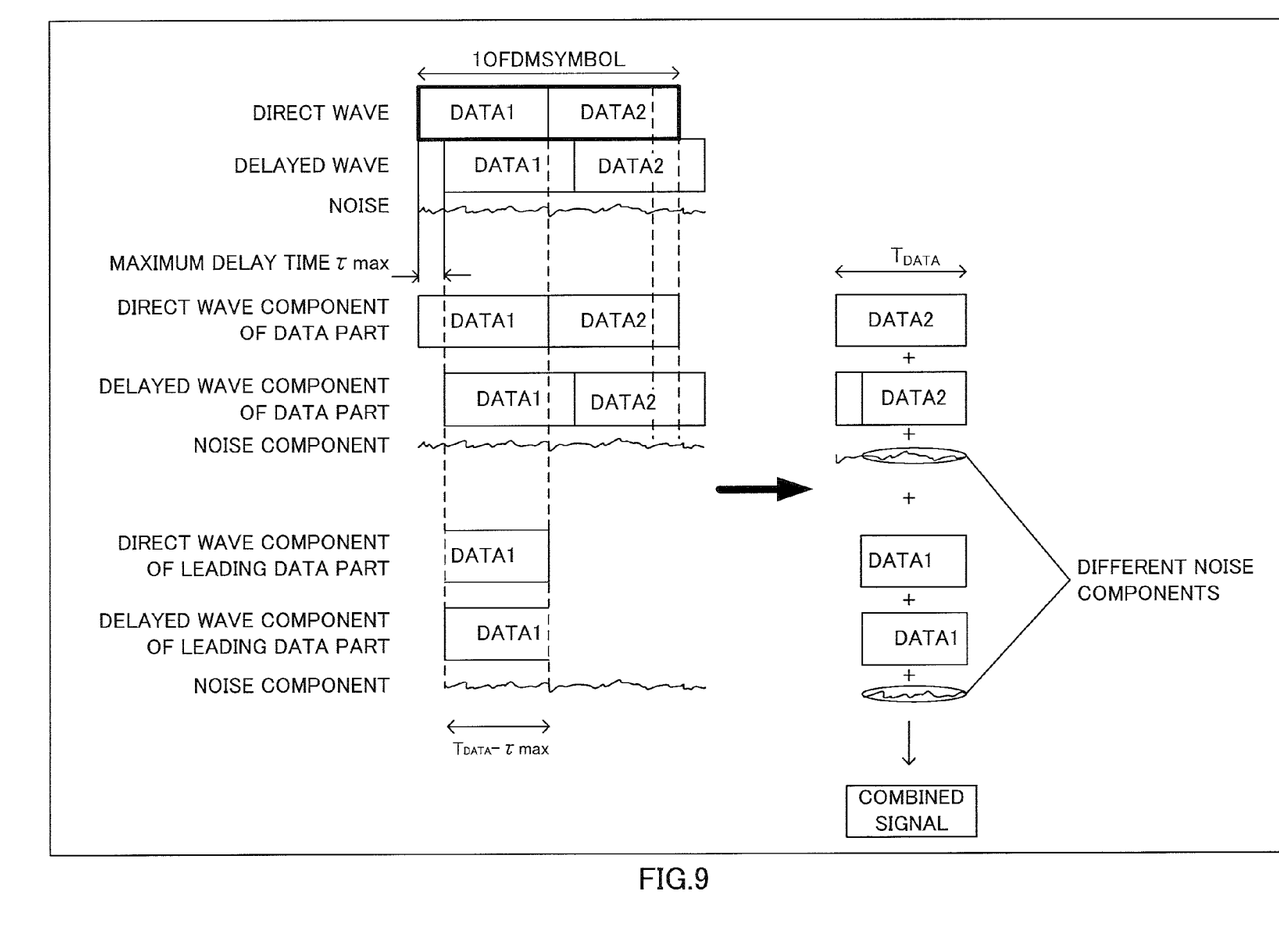
FIG. 9 explains a receiving process in the receiving apparatus shown in FIG. 7.

Next, operations by receiving apparatus 200 having the above configurations will be explained with reference to FIG. 9. For ease of explanation, a case will be described here where the number of times data is repeated, N, is 2, and where one OFDM symbol is formed with data 1 and data 2.

Data extracting section 204 extracts N−1 data from the rear end of the leading data part of the direct wave of the received signal combining the direct wave component, the delay wave component and the noise component generated in the receiving apparatus (hereinafter simply the "noise component"). Here, data extracting section 204 extracts data 2.

Further, leading data extracting section 207 extracts the leading data part of the length subtracting the maximum delay time τmax from the data part length $T_{DATA}$. To be more specific, leading data extracting section 207 extracts data of a length (the data part length $T_{DATA}$-the maximum delay time τmax) going back from the rear end of the leading data part, that is, data of the part not interfered with the data of adjacent time.

Data position adjusting section 208 adjusts the data position such that the rear end of the leading data extracted (the extracted leading data) and the rear end of data 2 match. Combining section 209 combines the extracted leading data after the data position adjustment, with data 2. This leading data part is the same data as data 2. If data 2 is taken to be copied and attached to the beginning of data 2, the leading data part can be regarded as a guard interval. The extracted leading data and the rear end of data 2 extracted by data extracting section 204 (the data of going back the length of $T_{DATA}-\tau max$ from the rear end of data 2) are the same signal, and the parts that are combined have mutually different noise components, and so combining these parts results in improving the SNR (Signal to Noise Ratio) in the combined part including the extracted leading data.

Figure 10:
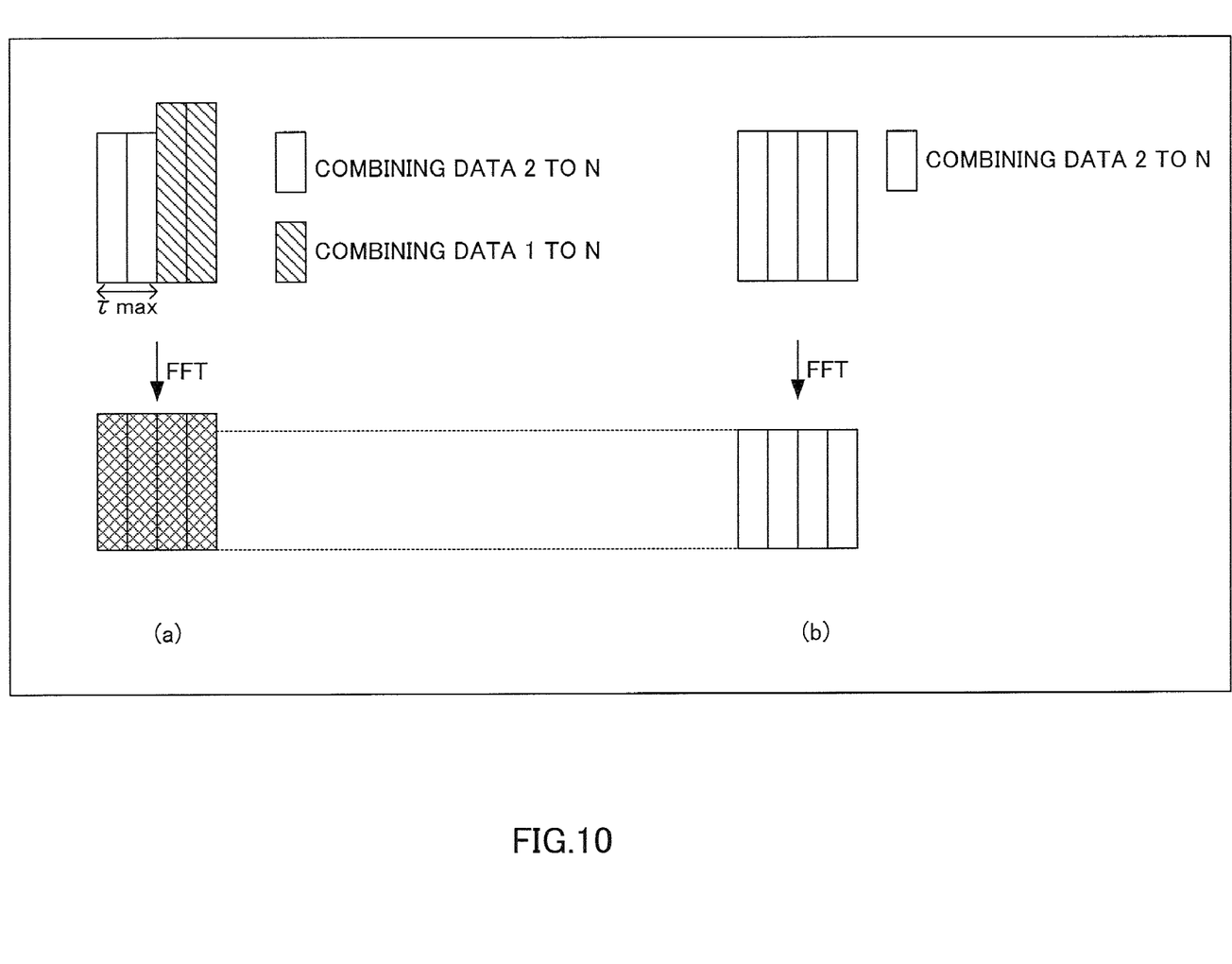
FIG. 10 explains the effect of FFT processing.

Next, advantages of FFT processing performed by FFT section 210 will be explained. A case will be described here where the maximum delay time $\tau max$ corresponds to sample number 1 and 2, using the transmission format shown in FIG. 6 as an example. In this case, the data extracted by leading data extracting section 207 is sample number 3 and 4 in the leading data part. Consequently, in the signal combined in combining section 209, with sample number 1 and 2, data 2 to N are combined, and, with sample number 3 and 4, data 1 to N are combined. As described above, the SNR of the combined part including the extracted leading data, that is, as shown in FIG. 10 (a), the SNR of sample number 3 and 4 improves more than the SNR of sample number 1 and 2.

In addition, when FFT section 210 performs FFT processing to the signal combined in combining section 209, the SNR improvement in sample number 3 and 4 is distributed over the whole of the signal after FFT processing. This is due to the characteristic of FFT processing. That is to say, the SNR improvement in a specific part of the time domain signal (here, sample number 3 and 4) leads to SNR improvement at all frequencies. Compared to the case of taking the leading data part to be a guard interval and not combining the leading data part in combining section 209, that is, the case of simply combining data 2 to N (see FIG. 10(b)), the SNR after FFT improves $10 \log (N-\tau max/T_{DATA})$ dB.

According to Embodiment 1, the signal after IFFT processing repeats being transmitted N times in one OFDM symbol period. Then, the receiving apparatus receiving the transmitted signal extracts the part not interfered with the data adjacent time, from the leading data part of the direct wave of the received signal. In addition, the receiving apparatus combines the data parts repeated and transmitted excluding the leading data part, and the extracted leading data part, in the received signal, aligning their ends, and performs FFT processing of the combined signal, thereby improving the SNR in all subcarriers after FFT.

Further, with the present embodiment, the number of times data is repeated, N, is a fixed value. However, the number of repetitions, N, may be adaptively change according to channel conditions, thereby controlling the error robustness according to channel conditions.

Embodiment 2

A case will be described here with Embodiment 2 of the present invention where part of subcarriers are used for transmission to receiving apparatus A and another part of subcarriers are used for transmission to receiving apparatus B.

Figure 11:
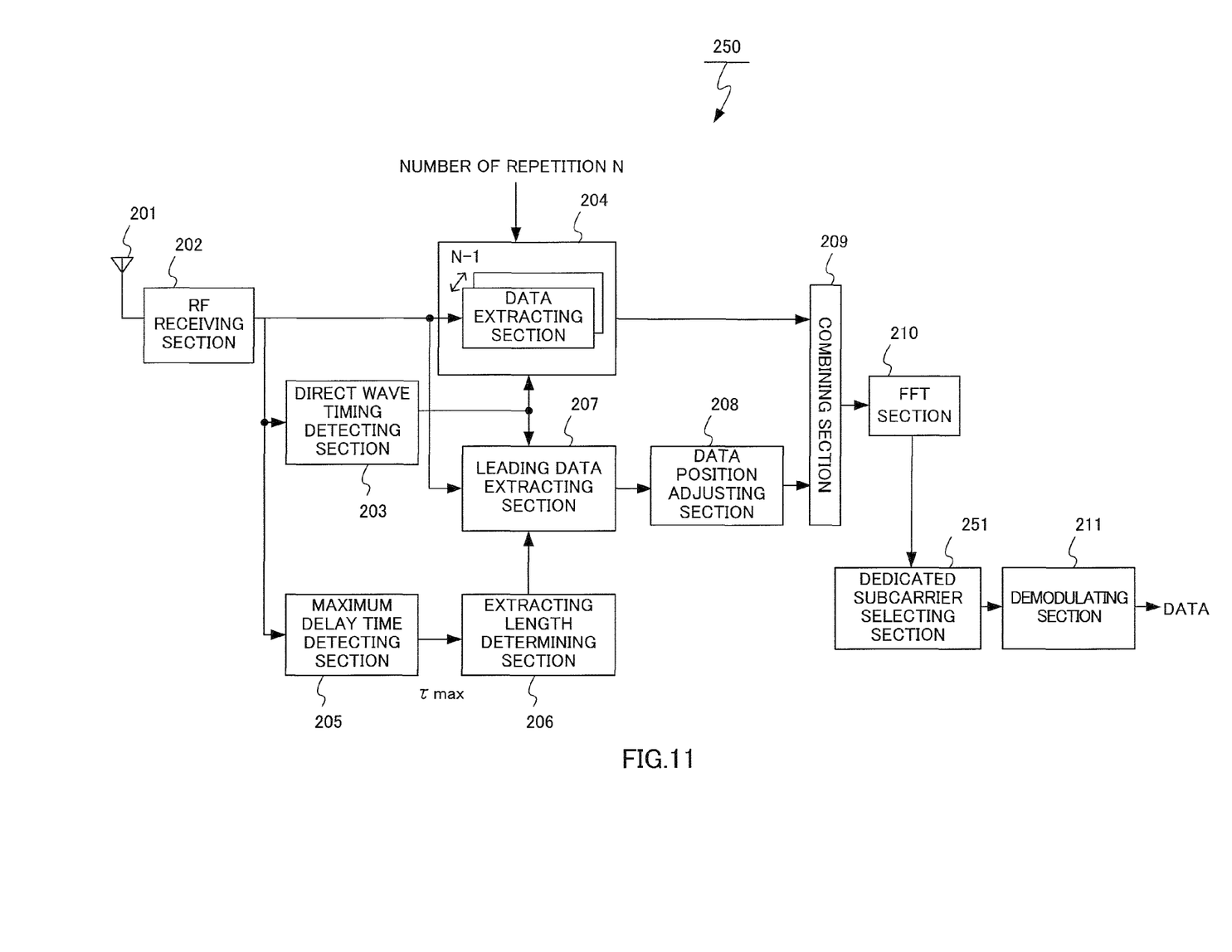
FIG. 11 is a block diagram showing a configuration of a radio receiving apparatus according to Embodiment 2 of the present invention.

FIG. 11 is a block diagram showing a configuration of receiving apparatus 250 according to Embodiment 2 of the present invention. Further, according to FIG. 11, the same components as those shown in FIG. 7 are assigned the same reference numerals and the details will be omitted. In comparison to FIG. 7, FIG. 11 adds dedicated subcarrier selecting section 251.

Dedicated subcarrier selecting section 251 selects the subcarriers for receiving apparatus 250 from the signal outputted from FFT section 210, and outputs the selected subcarriers to demodulation section 211.

Next, the operations of receiving apparatus 250 having the above configuration will be explained with reference to FIG. 12. For ease of explanation, the number of times data is repeated, N, is 2.

Figure 12A:
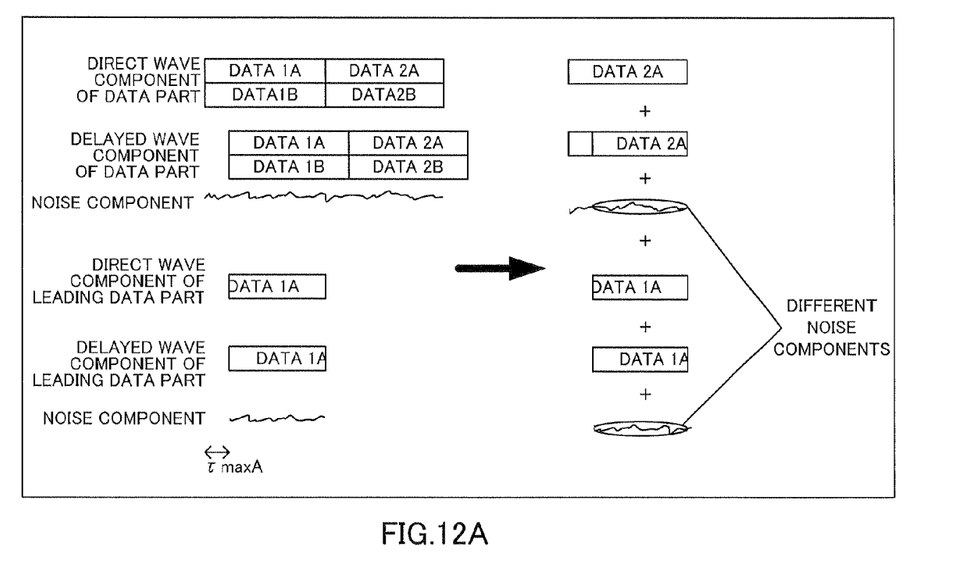
FIG. 12A explains a receiving process in the receiving apparatus shown in FIG. 11.
Figure 12B:
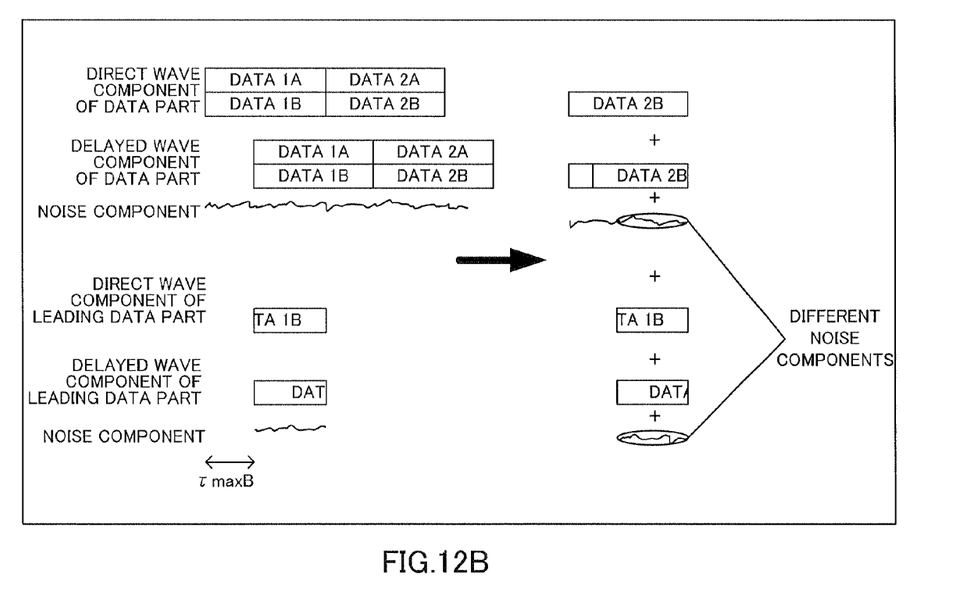
FIG. 12B explains a receiving process in the receiving apparatus shown in FIG. 11.

FIG. 12A shows an image of receiving processing in receiving apparatus A, FIG. 12B also shows an image of receiving processing in receiving apparatus B. As shown in FIGS. 12A and 12B, when part of subcarriers are used for the transmission to receiving apparatus A and another part of subcarriers are used for the transmission to receiving apparatus B, dedicated subcarrier selecting section 251 selects the subcarriers for each receiving apparatus, so that each receiving apparatus can perform the combining process described in Embodiment 1. In other words, although the maximum delay time $\tau max$ A in receiving apparatus A is different from the maximum delay time $\tau max$ B in receiving apparatus B, the guard interval needs not have a length in accordance with the receiving apparatus where the delay wave is maximum. Consequently, preventing the guard intervals from wasting transmission power is possible.

Here, the SNR in receiving apparatus A improves $10 \log (N-\tau maxA/T_{DATA})$ dB, and the SNR in receiving apparatus B improves $10 \log (N-\tau maxB/T_{DATA})$ dB.

By this means, according to Embodiment 2, although subcarriers are assigned to a plurality of radio receiving apparatuses and are transmitted all at the same time, each radio receiving apparatus selects its subcarriers, so that each radio receiving apparatus utilizes transmission power efficiently without being influenced by the maximum delay time of other radio receiving apparatuses and improve received quality.

Further, although the above embodiments have been described assuming a transmission format that does not attach guard intervals, the present invention is by no means limited to this, and transmission formats that attach guard intervals may be used.

If a transmission format that attaches guard intervals is used, the receiving apparatus replaces the part of the leading data described in Embodiment 1 with a guard interval. In other words, amongst the guard intervals received, the guard interval part that is not interfered with the data of adjacent time is extracted and combined with the data part. By this means, using the signal of the guard interval part, the SNR of the data part is improved and received quality is improved.

In the embodiments above, time-to-frequency conversion is performed using Fourier transform and time-to-frequency conversion is performed using inverse Fourier transform. However, the present invention is not limited to this, and other frequency-to-time conversion and time-to-frequency conversion such as discrete cosine transform and wavelet transform, may be used.

Figure 13:
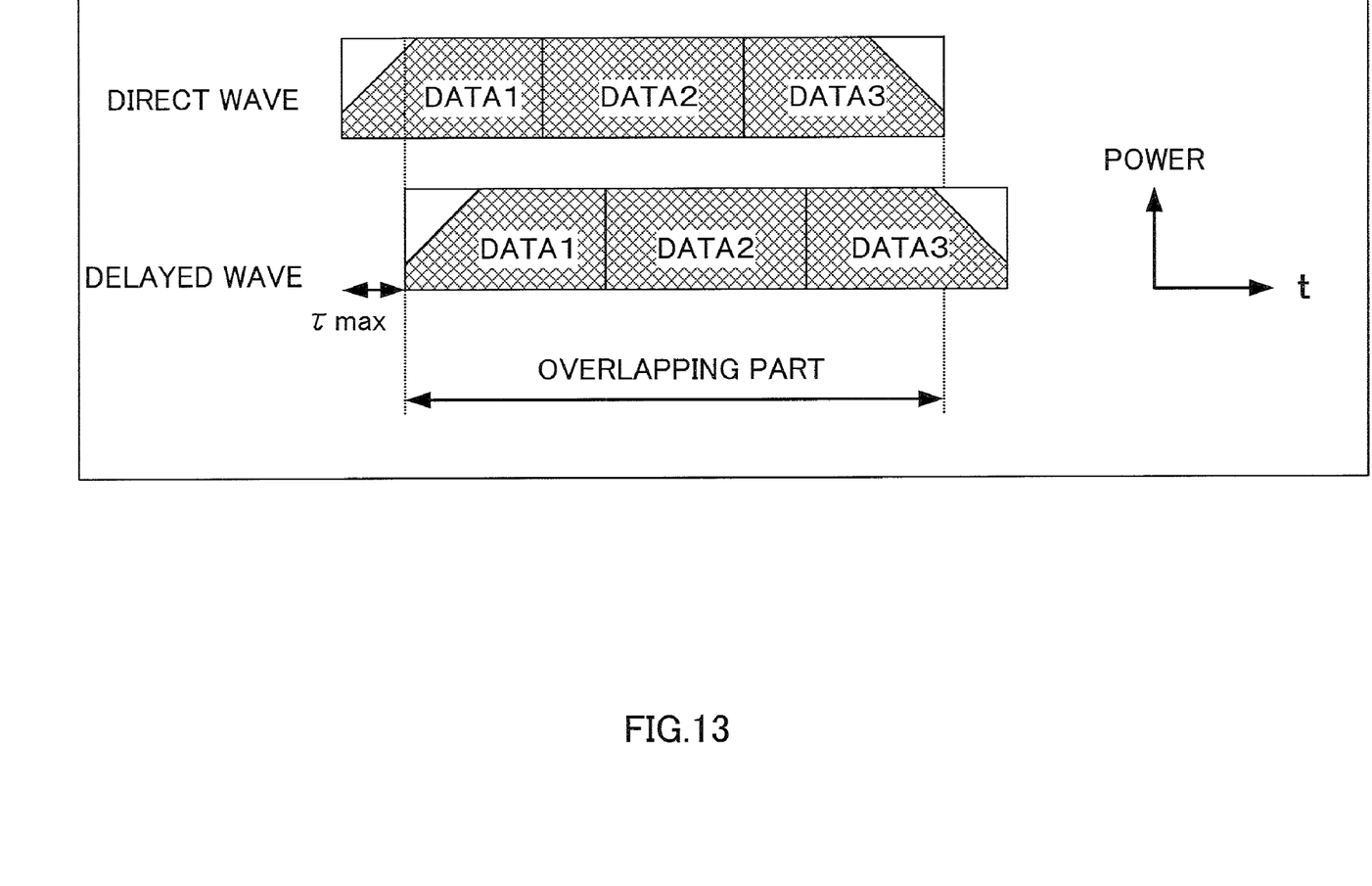
FIG. 13 is a conceptual figure showing power control.

In addition, referring to FIG. 13, given data 1 to data 3 arranged in repetition in an OFDM symbol, it is possible to reduce the power of the data over the length of $\tau max$ from the beginning of data 1 and from the tail of data 3 and distribute the reduced power over the rest, that is, over the overlapping part of the direct wave and the delayed wave. This further increases the SNR improvement in the overlapping part of the direct wave and the delayed wave.

For example, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

A first aspect of the present invention employs a configuration in which a radio transmitting apparatus comprises: a modulating section that modulates transmission data; an inverting section that inverts the transmission data modulated by the modulating section, from a frequency domain to a time domain; and a data repetition section that repeats transmitting in the time domain the signal converted in the inverting section a plurality of times, on a per data part basis, the data part being a unit of repetition.

A second aspect of the present invention employs a configuration in which, in the radio transmitting apparatus of the above configuration, the data repetition section repeats transmitting the signal converted in the inverting section in one symbol period of an OFDM symbol.

According to these configurations, guard intervals are not attached, so that the loss of transmission power with guard intervals that are not used for demodulation, is minimized.

A third aspect of the present invention employs a configuration in which, in the radio transmitting apparatus of the above configuration, the data repetition section adaptively changes a number of repetitions in accordance with a channel condition.

According to this configuration, the number of repetitions is adaptively changed in accordance with channel conditions, thereby controlling error robustness in accordance with channel conditions.

A fourth aspect of the present invention employs a configuration in which a radio receiving apparatus comprises: a receiving section that receives a signal inverted from a frequency domain to a time domain and repeated being transmitted a plurality of times in the time domain; a leading data extracting section that extracts, from a leading data part amongst data parts in the signal received by the receiving section, a portion of the leading data part that is not interfered with data of adjacent time, the data parts being units of repetition in the signal; a combining section that matches and combines a rear end of each data part in the signal received by the receiving section other than the leading data part, with a rear end of the portion of the leading data part extracted by the extracting leading data section; and a converting section that converts the signal combined in the combining section from the time domain to the frequency domain.

A fifth aspect of the present invention employs a configuration in which, in the radio receiving apparatus of the above configuration, the leading data extracting section extracts a maximum delay time of a delayed wave from the received signal received by the receiving section and extracts a portion of the leading data part equaling a length subtracting the extracted maximum delay time from a data part length.

According to these configurations, the parts that are combined in the combining section contain different noise components, and so combining these parts results in improving the received quality of the combined part including the portion of the leading data part extracted by leading data extracting section. Furthermore, the conversion of the combined signal results in improving received quality at all frequencies.

A sixth aspect of the present invention employs a configuration in which the radio receiving apparatus of the above configuration further comprises a subcarrier selecting section that selects a subcarrier for the radio receiving apparatus.

According to this configuration, when subcarriers are assigned to a plurality of radio receiving apparatuses and are transmitted all at the same time in one OFDM symbol, each radio receiving apparatus selects its subcarriers, so that each radio receiving apparatus utilizes transmission power efficiently without being influenced by the maximum delay time of other radio receiving apparatuses and improves receiving quality.

The present application is based on Japanese Patent Application No. 2005-066812, filed on Mar. 10, 2005, the entire content of which is expressly incorporated by reference herein.

INDUSTRIAL APPLICABILITY

The radio transmitting apparatus and the radio receiving apparatus according to the present invention minimize energy loss due to attachment of guard intervals and improve received quality, and are applicable suitable for a base station apparatus and a mobile station apparatus used in orthogonal frequency division multiplexing transmission systems.

The invention claimed is:

1. A radio receiving apparatus, comprising:
a receiving section that receives a signal that is inverted from a frequency domain to a time domain and repeatedly transmitted a plurality of times in the time domain;
a leading data extracting section that extracts, from a leading data part of data parts in the received signal, data of a length that is equal to a difference between a maximum delay time of a delayed wave in the received signal and a data part length, the extracted data going back from a rear end of the leading data part, and the data parts being units of repetition in the received signal;
a combining section that combines each data part in the received signal, other than the leading data part, with the extracted data of the leading data part, by matching respective rear ends, to generate a combined signal; and
a converting section that converts the combined signal from the time domain to the frequency domain.

2. The radio receiving apparatus according to claim 1, further comprising a subcarrier selecting section that selects a subcarrier for the radio receiving apparatus.

3. A radio receiving method, comprising:
receiving a signal that is inverted from a frequency domain to a time domain and repeatedly transmitted a plurality of times in the time domain;
extracting, from a leading data part of data parts in the received signal, data of a length that is equal to a difference between a maximum delay time of a delayed wave in the received signal and a data part length, the extracted data going back from a rear end of the leading data part, and the data parts being units of repetition in the received signal;

combining each data part in the received signal, other than the leading data part, with the extracted data of the leading data part, by matching respective rear ends, to generate a combined signal; and converting the combined signal from the time domain to the frequency domain.

* * * * *